United States Patent [19]
Morton

[11] 3,866,620

[45] Feb. 18, 1975

[54] FLUID CONTROL VALVE

[75] Inventor: Robert O. Morton, Costa Mesa, Calif.

[73] Assignee: Bertea Corporation, Irvine, Calif.

[22] Filed: Aug. 14, 1972

[21] Appl. No.: 280,220

[52] U.S. Cl............................ 137/83, 137/625.64
[51] Int. Cl......... F15b 5/00, F15c 3/14, F15b 11/00
[58] Field of Search............ 137/83, 625.64, 625.63; 91/3

[56] References Cited
UNITED STATES PATENTS

| 3,039,483 | 6/1962 | Deering | 137/83 |
| 3,082,781 | 3/1963 | Moosmann | 137/83 |
| 3,362,423 | 1/1968 | Swinehart | 137/83 |
| 3,446,229 | 5/1969 | Howland | 137/625.64 X |
| 3,542,051 | 11/1970 | McFadden | 137/83 |
| 3,612,103 | 10/1971 | Waddington | 137/625.64 |

FOREIGN PATENTS OR APPLICATIONS

| 689,814 | 6/1930 | France | 91/3 |

Primary Examiner—Alan Cohan
Attorney, Agent, or Firm—George F. Smyth

[57] ABSTRACT

A servovalve connectible to a source of fluid under pressure comprising first and second receiver passages having first and second inlets, respectively, ejector passage means connectible to the source of fluid and having discharge orifice means spaced from and generally opposite from the inlets, a diverter having first and second outer peripheral sections mounted for movement in the fluid discharged by the discharge orifice means. By appropriately diverting the fluid from the discharge orifice means, a differential fluid output can be provided in the receiver passages. The differential fluid output can be used, for example, to position a spool valve.

12 Claims, 16 Drawing Figures

FLUID CONTROL VALVE

BACKGROUND OF THE INVENTION

In one form of servovalve, a fluid stream from a single discharge orifice is apportioned between two receiver passages to thereby provide a differential fluid output in the receiver passages. The differential fluid output can be used, for example, to position a spool valve or to perform other control functions.

U.S. Pat. No. 3,542,051 shows a servovalve in which the fluid stream from a single discharge orifice is apportioned between two converging receiver passages by a diverter. The diverter has an opening therein through which all of the fluid passes and, accordingly, the diverter is similar to a jet pipe. The two converging receiver passages form a sharp or knife edge therebetween which splits the fluid stream into two branches. Thus, the diverter directs the stream, and the sharp edge splits or divides the stream.

One disadvantage of this construction is that the sharp edge between the receiver passages tends to erode or flatten during use. In addition, the discharge orifice is axially disaligned from the inlets of the two receiver passages with the result that pressure recovery in the two receiver passages is not maximized. Also, the opening through the diverter is defined in part by a pair of opposed, slanted, planar surfaces and these are relatively difficult to make.

SUMMARY OF THE INVENTION

The present invention provides a servovalve which overcomes the above noted disadvantages. The present invention eliminates the sharp edge between the receiver passages thereby making the receiver much easier to make. This removes the flow dividing function from the receiver.

According to one aspect of the present invention, flow division is carried out upstream of the diverter. With this arrangement, one discharge orifice is provided for each receiver passage. Each discharge orifice is spaced from and generally opposite to the inlet of the associated receiver passage, and accordingly, more pressure recovery is obtained than if the discharge orifice and the associated inlet were axially disaligned. For purposes of illustration, it is assumed hereinbelow that two orifices and two receiver passages are employed, it being understood that the number of these elements may be varied if desired.

The flow division function is performed by a diverter. The diverter has first and second peripheral sections against which the first and second fluid streams can impinge, respectively. Each peripheral section diverts fluid from its associated stream between the inlet of the associated receiver passage and return. Preferably the peripheral sections are opposed end sections of the diverter.

One advantage of the diverter is that it can be imperforate. Because the peripheral sections of the diverter carry out the flow diversion function, it is not necessary to provide an opening for receiving and directing a fluid stream. This facilitates construction of the diverter.

The diverter may take the form of a deflector in which the first and second fluid streams impinge the first and second peripheral sections, respectively, when the deflector is in the neutral position. Alternatively, the diverter may take the form of an interrupter in which neither of the fluid streams are diverted when the interrupter is in the neutral position.

The peripheral sections preferably include opposed end faces of the diverter. Each of these end faces can advantageously be rectangular. In one form of the invention, these end faces diverge in the direction of flow. This may improve pressure recovery.

According to another aspect of the present invention, only a single discharge orifice is provided for two receiver passages and a single diverter is used to divide the single stream into two stream sections and to direct these two stream sections toward the first and second receiver passages, respectively. This form of the invention has the advantage of only a single discharge orifice and of an imperforate diverter. In this form of the invention, the diverter divides the single stream into two streams, controls the portion of fluid in each of the two streams, and apportions each of the two streams between its associated inlet and return.

The diverter can advantageously be controlled by a torque motor. The torque motor includes a torque arm mounted for pivotal movement in response to an electromagnetic force. Pivotal movement of the torque arm is resisted by a spring which is in flat strip form. The torque arm is connected to, or defines, at one end thereof the diverter so that pivotal movement of the torque arm results in diverter movement. Conduit means provide fluid communication between the spring and the space between the discharge orifice and the inlets of the receiver passages. This pressure is supplied to both faces of the spring strip so that the spring strip is not affected by any fluctuation in fluid pressure in this space.

The differential fluid output in the receiver passages can be used, for example, to position a valve spool. The valve spool may, in turn, be used for a variety of purposes including the positioning of a fluid responsive actuator. In one form of the invention, the differential fluid output positions a spool valve and a spring provides mechanical feedback from the spool to the torque arm.

The invention can best be understood by reference to the following description taken in connection with the accompanying illustrative drawing.

3

Figure 4:
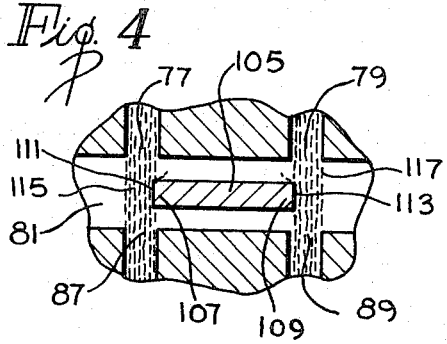
FIG. 4 is an enlarged fragmentary sectional view of the central position of FIG. 3 with the diverter in the neutral position.
Figure 7:
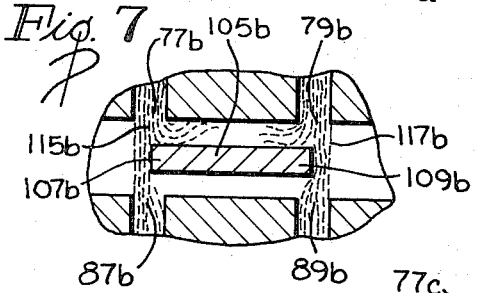

FIG. 7 is a fragmentary sectional view similar to FIG. 4 of a third form of diverter in the neutral position.

Figure 5:
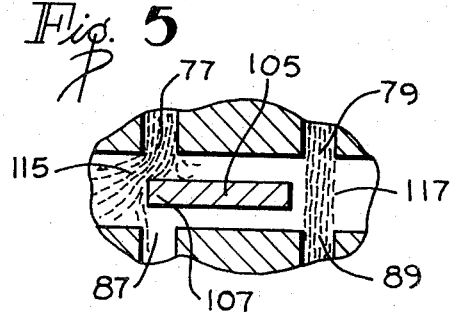
FIG. 5 is a fragmentary sectional view similar to FIG. 4 with the diverter moved out of the neutral position.
Figure 8:
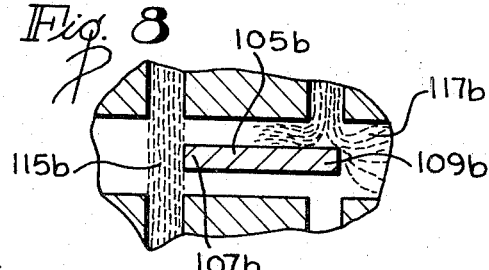

FIG. 8 is a fragmentary sectional view similar to FIG. 5 with the diverter of FIG. 7 moved out of the neutral position.

Figure 9:
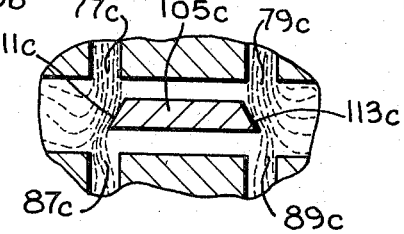

FIG. 9 is a fragmentary sectional view similar to FIG. 4 of a fourth form of diverter in the neutral position.

Figure 10:
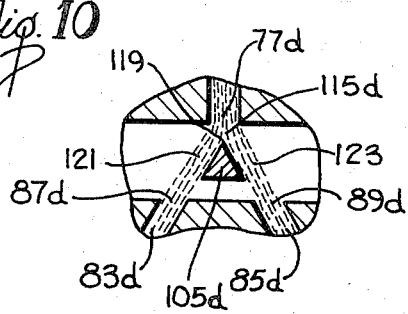

FIG. 10 is a fragmentary sectional view similar to FIG. 4 of a fifth form of diverter in the neutral position.

Figure 11:
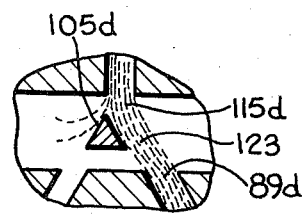

FIG. 11 is a fragmentary sectional view similar to FIG. 5 with the diverter of FIG. 10 moved out of the neutral position.

Figure 12:
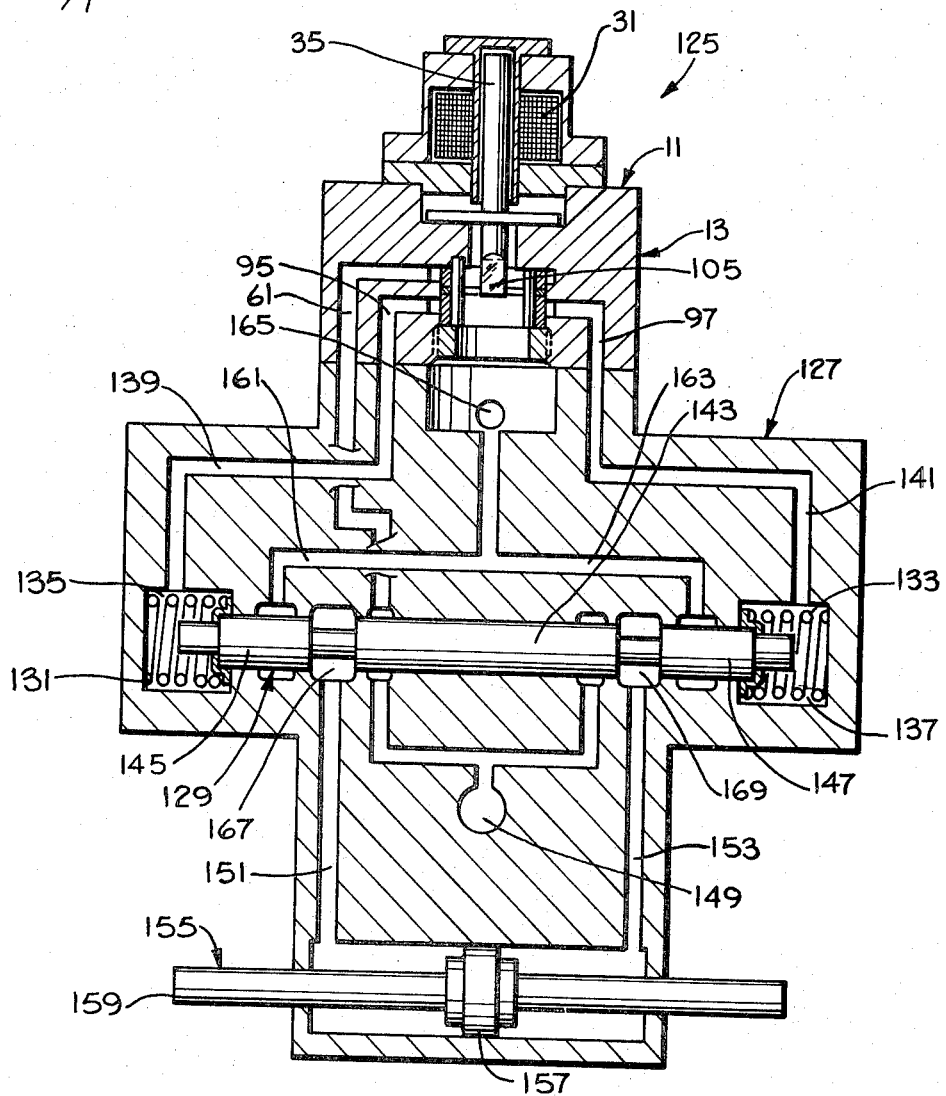

FIG. 12 is a sectional view showing a multi-stage servovalve constructed in accordance with the teachings of this invention.

Figure 13:
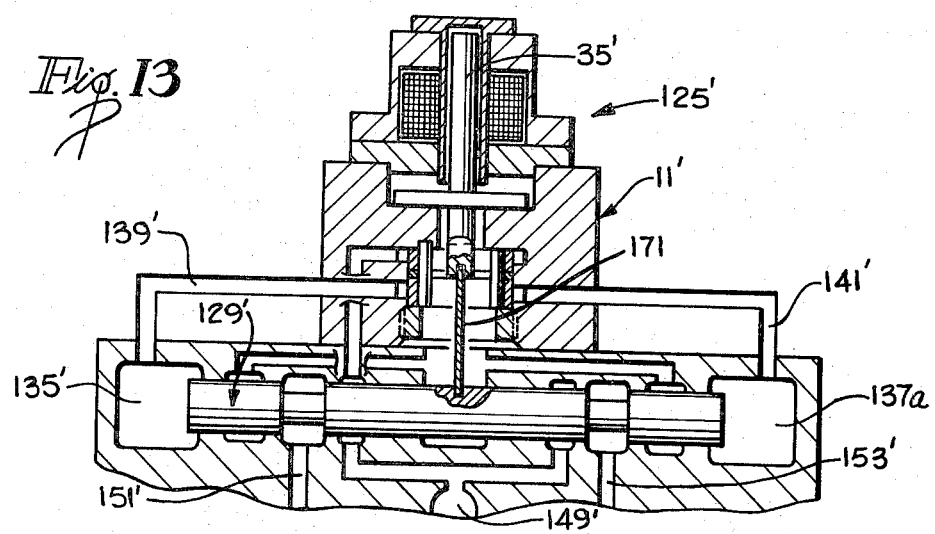

FIG. 13 is a fragmentary sectional view showing a second form of multi-stage servovalve constructed in accordance with the teachings of this invention.

DESCRIPTION OF THE PREFERRED EMBODIMENTS

Figure 1:
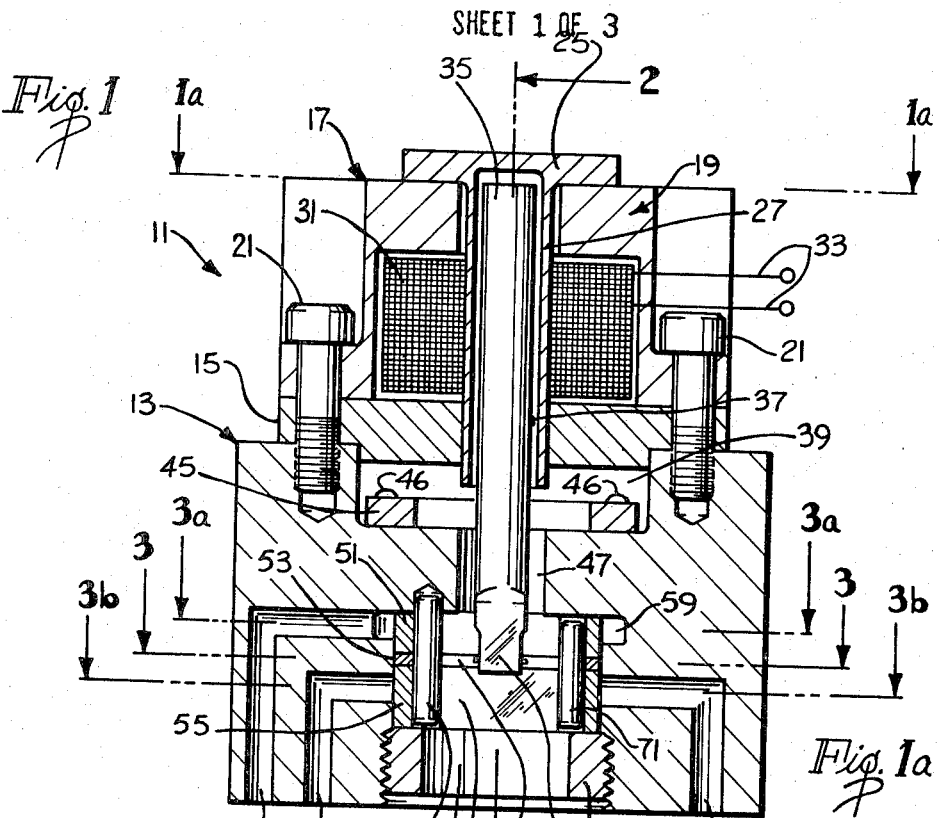
FIG. 1 is an axial sectional view of a single stage servovalve constructed in accordance with the teachings of this invention.
Figure 1A:
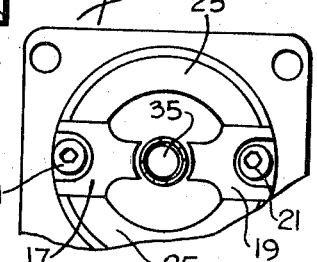
FIG. 1a is a view taken generally along line 1a—1a of FIG. 1.

FIG. 1 shows a servovalve 11 constructed in accordance with the teachings of this invention. The servovalve 11 includes a body 13 having a plate 15 and pole pieces 17 and 19 affixed thereto in any suitable manner such as by screws 21, respectively. Permanent magnets 23 and 25 (FIG. 1a) are attached to the plate 15 in any suitable manner such as by screws 26. Each of the magnets 23 and 25 is in the form of an arcuate segment with opposite ends of the magnets engaging opposite ends of the pole pieces 17 and 19. The magnets 23 and 25 have flux paths extending through the pole pieces 17 and 19 in the plane of FIG. 1a as shown to provide the pole pieces with fixed, opposite polarities. An isolation tube 27 of nonmagnetic material is mounted on the plate 15 in any suitable manner such as by a press fit. The isolation tube 27 extends from a region adjacent the upper ends of the pole pieces through the plate 15 and acts as a fluid seal.

A coil 31 is wound around the isolation tube 27 and a pair of leads 33 extend outwardly of the coil to permit energization thereof. The flux path for the coil 31 is in the plane of FIG. 1 and forms a 90° angle with the flux paths of the magnets 23 and 25. The isolation tube 27 isolates the coil from fluid within the isolation tube.

A torque arm or armature 35 extends from a location within the isolation tube 27 adjacent the segments 23 and 25 downwardly into the body 13. The torque arm 35 is spaced from the isolation tube 27 by an annular gap 37 when the coil 31 is de-energized.

Figure 2:
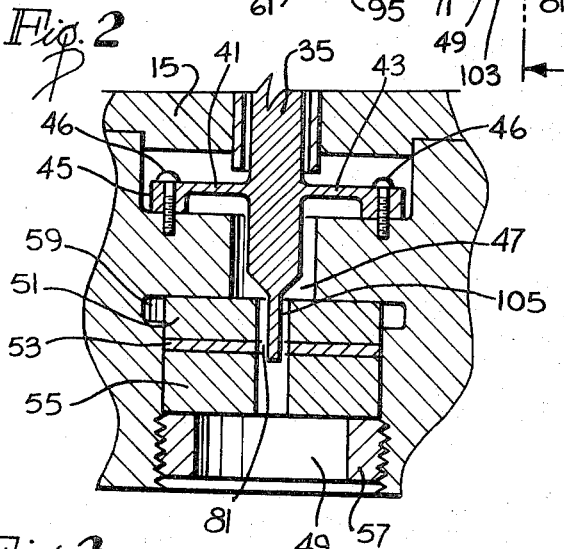
FIG. 2 is a fragmentary sectional view taken generally along line 2—2 of FIG. 1.

With reference to FIGS. 1 and 2, the upper end of the body 13 defines a well 39 and a pair of torsion springs 41 and 43 integral with the torque arm 35 project radially thereof in the well 39. Each of the springs 41 and 43 is in the form of a circumferentially narrow, radially extending, resilient strip. The outer ends of the springs 41 and 43 are integral with a ring 45 which rests on the bottom wall of the well 39. The ring 45 is fixedly attached to the body 13 as by screws 46.

The body 13 has a bore 47 and a counterbore 49 which serve to provide communication between the exterior of the body and the well 39. An inner plate 51, an intermediate plate 53, and an outer plate 55 are retained in the counterbore 49 by a threaded, annular bushing 57. With reference to FIGS. 1, 2 and 3a, the body 13 defines an annular passage 59 around the inner plate 51 and defines a conduit 61 which leads to a source of fluid under pressure (not shown). The inner plate 51 has a pair of openings 63 and 65 each of which communicates with the annular passage 59 via a groove 67 formed in the uppor portion of the inner plate. A central slot 69 extends all the way through the inner plate 51 and dowel pins 71 project through the slot 69 to align the inner plate with the plates 53 and 55.

Figure 3:
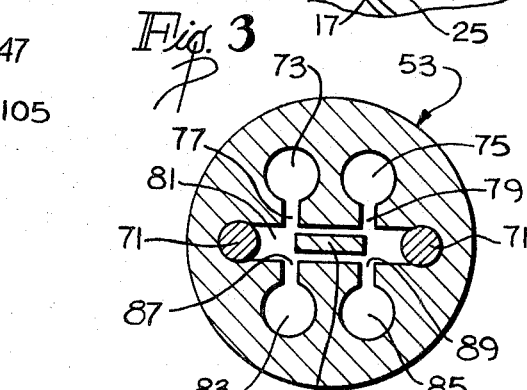
FIG. 3 is an enlarged sectional view taken generally along line 3—3 of FIG. 1.
Figure 3A:
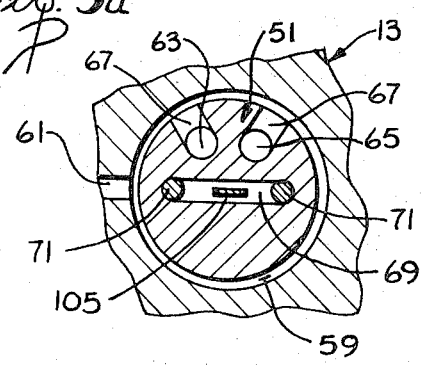
FIG. 3a is a sectional view taken along line 3a—3a of FIG. 1.

With reference to FIGS. 1, 2 and 3, the intermediate plate 53 has a pair of ejector passages 73 and 75 which are aligned with and communicate with the openings 63 and 65, respectively, of the inner plate 51. The ejector passages 73 and 75 have parallel portions which terminate in discharge orifices 77 and 79, respectively. The discharge orifices 77 and 79 open into a central slot 81 which is of the same size and shape as the slot 69 and which is aligned therewith.

The intermediate plate 53 also has receiver passages 83 and 85 having inlets or receiver orifices 87 and 89, respectively, which open at the slot 81. The discharge orifices 77 and 79 are aligned with the receiver orifices 87 and 89, respectively, and are spaced therefrom by the width of the slot 81. All of the cutout regions of the intermediate plate 53 extend completely through the plate.

Each of the discharge orifices 77 and 79 is preferably of rectangular configuration and axially aligned with the associated inlets 87 and 89. Each of the receiver orifices 87 and 89 is preferably of rectangular cross section and geometrically similar to the associated orifices 77 and 79. The receiver orifices 87 and 89 are of the same or slightly different area than the associate discharge orifices 77 and 79, depending upon the control characteristics desired.

Figure 3B:
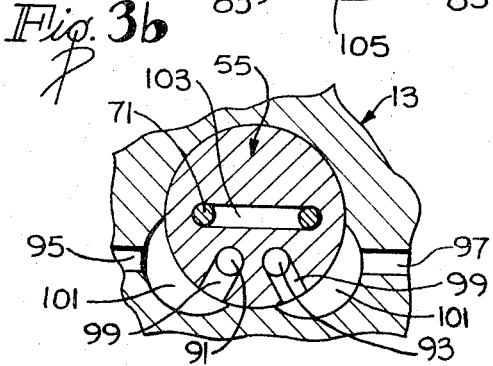
FIG. 3b is a sectional view taken along line 3b—3b of FIG. 1.

With reference to FIGS. 1, 2 and 3b, the outer plate 55 has openings 91 and 93 which communicate with the receiver passages 83 and 85, respectively. The openings 91 and 93 are placed in communication with output passages 95 and 97, respectively, by grooves 99 in the plate 55 and grooves 101 in the body 13. The plate 55 has a central slot 103 which is aligned with the slots 69 and 81.

The bushing 57 bears on the outer face of the outer plate 55 to hold the plates 51, 53 and 55 in the counterbore 49. Proper alignment between the plates 51, 53 and 55 is maintained by the dowel pins 71 which pass through the slots 69, 81 and 103.

The lower end of the torque arm 35 projects through the slots 69 and 81 and into the slot 103 and forms a diverter 105. The diverter 105 need not be integral with the torque arm 35 but may be driven by the torque arm in any suitable manner. The diverter 105 is rectangular in cross section as shown in FIGS. 3–5. The diverter 105 has opposite end portions 107 and 109 and rectangular end faces 111 and 113 defined by opposed pairs of straight, parallel edges. As is evident from FIGS. 1, 2, 4 and 5, the end faces 111 and 113 are planar.

In operation, fluid under pressure enters the conduit 61 and passes to the ejector passages 73 and 75 through the annular passage 59, the grooves 67 and the openings 63 and 65 (FIG. 3a). Because the fluid in the ejector passages 73 and 75 is under pressure, it is discharged through the orifices 77 and 79 in relatively high velocity streams 115 and 117, respectively, (FIG. 4). The streams 115 and 117 are substantially entirely received by the receiver orifices 87 and 89 absent diversion by the diverter 105. In the neutral position of the diverter 105, the diverter is not impinged by the streams 115 and 117 and, accordingly, the diverter exerts substantially no effect on the flow of the streams. However, if the diverter is moved, for example, to the left to the position shown in FIG. 5, the end portion 107 is impinged by the stream 115 with the result that this stream is partially deflected away from the inlet 87. The fluid which is diverted and which does not enter one of the receiver orifices 87 and 89 passes to return via the slots 81 and 103 and the counterbore 49. The stream 117 is unimpeded and is substantially entirely collected by the receiver orifice 89. The result is a pressure differential in the output passages 95 and 97. As explained more fully hereinbelow in connection with FIGS. 12 and 13, this pressure differential can be utilized in various ways to produce a useful output.

It should be noted that the diverter 105 is imperforate and that the end portions 107 and 109 accomplish the stream diversion function. Obviously, the magnitude of the pressure differential in the passages 95 and 97 is a function of the degree to which the diverter is displaced from the neutral position. By moving the diverter 105 to the right from the neutral position shown in FIG. 4, the end portion 109 will be operative to divert the stream 117.

The diverter 105 can be moved relative to the receiver orifices 87 and 89 by different mechanisms; however, it is preferred to use the torque motor shown in FIG. 1. By energizing the coil 31 in a first direction, the upper end of the torque arm 35 is caused to be of a first polarity with the result that it is attracted toward one of the pole pieces 17 and 19 and repelled by the other of the pole pieces. This causes the torque arm 35 to tilt with such tilting movement being resisted by the springs 41 and 43. The axis about which such pivoting occurs is generally transverse to the torque arm. Such tilting of the torque arm 35 moves the lower end portion of the torque arm, i.e., the diverter 105 along the longitudinal axis of the slot 81 relative to the streams 115 and 117.

By energizing the coil 33 in the opposite direction, the torque arm 35 tends to pivot or tilt in the opposite direction. The magnitude of the energizing signal for the coil 31 controls the amount which the torque arm 35 pivots.

The bore 47 maintains the well 39 in communication with fluid at return pressure. Accordingly, fluid at return pressure acts on both faces of the springs 41 and 43 with the result that changes in return pressure do not affect the springs. The isolation tube 27 isolates the coil 31 from fluid at return pressure.

Figure 6:
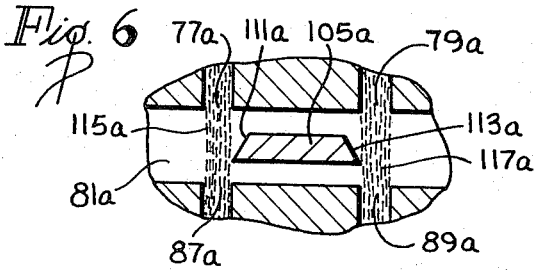
FIG. 6 is a fragmentary sectional view similar to FIG. 4 of a second form of diverter in the neutral position.

FIG. 6 shows a diverter 105a which is identical to the diverter 105 except that the end faces 111a and 113a are inclined so that they diverge as they extend in the direction of flow of the streams 115a and 117a. The edges of the end faces 111a and 113a closer to the inlets 87a and 89a are just out of or slightly touching the fluid streams 115a and 117a in the neutral position. In all other respects, the embodiment of FIG. 6 is identical to the embodiment of FIGS. 1-5 and corresponding parts are designated by corresponding reference numerals followed by the letter a.

FIGS. 7 and 8 show a diverter 105b which is identical to the diverter 105 (FIGS. 1-5) except that the diverter 105b has been elongated so that it performs as a jet deflector. Corresponding parts of the embodiment of FIGS. 7 and 8 are designated by corresponding reference numerals followed by the letter b. In the neutral position shown in FIG. 7, the diverter 105b projects into both of the streams 115b and 117b with the result that equal but less than maximum pressures exist at the receiver orifices 87b and 89b. By moving the diverter 105b to the right from the neutral position, the stream 115b is disrupted to a lesser degree and the stream 117b is disrupted to a greater degree. This results in a more rapid differential pressure change at the inlets 87b and 89b than in the embodiment of FIGS. 1-5. At the extreme righthand position of the diverter 105b, the end portion 109b completely disrupts the stream 117b and the end portion 107b is completely out of the stream 115b.

The embodiment of FIG. 9 is identical to the embodiment of FIGS. 7 and 8 except that the diverter 105c has inclined end faces 111c and 113c which diverge in the direction of flow.

In the embodiment of FIGS. 10 and 11, the diverter 105d is in the form of a triangular prism and only a single discharge orifice 77d is provided. The orifice 77d is positioned intermediate the receiver orifices 87d and 89d and the receiver passages 83d and 85d diverge as they extend away from their respective inlets.

The diverter 105d has a leading edge 119 which, in the neutral position, lies along the axis of the discharge orifice 77d and equally divides the stream 115d into streams 121 and 123 which are received by the receiver orifices 87d and 89d, respectively. The diverter 105d can be moved to the position shown in FIG. 11 in which it diverts substantially all of the stream 115d into the inlet 89d. Thus, the operation of the diverter 105d is analogous to the operation of the diverter 105b (FIG. 7) in that movement of the diverter 105d diminishes one of the streams 121 and 123 while simultaneously increasing the other of the streams.

FIG. 12 shows a servo system 125 which includes the servovalve 11 of FIGS. 1-3 and a power spool valve and actuator. The servovalve 11 may employ any of the configurations shown in FIGS. 4-11.

The servo system 125 includes a body 127 suitably affixed to or integral with the body 13. A valve spool 129 is slidably mounted in the body 127 and normally maintained in a neutral position by springs 131 and 133 in chambers 135 and 137, respectively. The output passages 95 and 97 are placed in fluid communication with the chambers 135 and 137 by conduits 139 and 141, respectively. The valve 129 has a central land 143 and end lands 145 and 147. The body 127 receives fluid at supply pressure in a conduit 149 which transmits the fluid to the valve spool 129. With the valve spool in the neutral position illustrated in FIG. 12, the land 143 blocks flow of fluid at supply pressure to either of the passages 151 and 153 which lead to an actuator 155. In the embodiment illustrated, the actuator 155 includes a piston 157 and the output shaft 159. The valve body 127 also provides return passages 161 and 163 which lead to a port 165 which leads to return.

In operation of the servo system 125, differential fluid output is created in the passages 95 and 97 by the servovalve 11 in the manner described above. This results in a corresponding differential fluid output in the chambers 135 and 137. For example, if the pressure in the chamber 135 exceeds the pressure in the chamber 137, the valve spool 129 is moved to the right with the result that a groove 167 between the lands 143 and 145 provides communication between the supply conduit 149 and the passage 151. Simultaneously, a groove 169 between the lands 143 and 147 provides communication between the passages 153 and 163. Accordingly, fluid at supply pressure is supplied to the lefthand face of the piston 157 of the actuator 155 and the righthand face of the piston is open to return. The differential fluid pressure causes the piston 157 to move to the right against a load (not shown).

In the system of FIG. 12, the torque arm 35 and hence the diverter 105 are moved to a predetermined position in response to the application of a given current to the coil 31. This produces a fixed differential pressure in the chambers 135 and 137 which is resisted by one of the springs 131 and 133. The valve spool 129 will seek a position at which the force from the differential fluid pressure in the chambers 135 and 137 equals the spring force on the valve spool.

FIG. 13 shows a servo system 125' which is identical to the servo system 125 (FIG. 12) except in the system 125' the springs 131 and 133 have been eliminated and a feedback spring 171 has been added. Portions of the servo system 125' corresponding to the servo system 125 are designated by corresponding primed reference numerals.

The feedback spring 171 in the embodiment illustrated is in the form of a beam or leaf which is attached to the valve spool 129' at one end and to the torque arm 35' at the other. When current is supplied to the coil 31', it moves the torque arm 35' and hence the diverter 105' to generate flow to initiate movement of valve spool 129'. The feedback spring 171 resists relative movement between the valve spool 129 and the torque arm 35a with such force increasing as displacement of the valve spool increases. The spring 171 resiliently initiates the return of the torque arm 35 back to a neutral position and ultimately a position is reached at which the biasing force of the spring 171 equals the electromagnetic force applied to the torque arm 35a. The passages 151a and 153a may connect the valve spool 129 with any other suitable fluid component such as the actuator 155.

Although exemplary embodiments of the invention have been shown and described, many changes, modification and substitutions may be made by one having ordinary skill in the art without necessarily departing from the spirit and scope of this invention.

I claim:

1. A servovalve connectible to a source of fluid comprising:

means defining first and second receiver passages, said first and second receiver passages having first and second receiver orifices, respectively;

ejector passage means connectible to the source of fluid, said ejector passage means having discharge orifice means spaced from said receiver orifices for discharging fluid across the space between the discharge orifice means and the receiver orifices;

a diverter having first and second opposite end portions;

means for mounting said diverter for movement in the fluid discharged by the discharge orifice means so that said end portions can be impinged by and divert the fluid discharged by said discharge orifice means relative to said said receiver orifices whereby a differential fluid output can be provided in said receiver passages, said end portions being spaced apart in the direction of movement of said diverter;

a torque motor including an elongated torque arm mounted for movement about a pivot axis which extends generally transverse to the axis of the torque arm; and said diverter being drivingly connected to the torque arm whereby pivotal movement of the torque arm moves the diverter to control said fluid output in the receiver passages.

2. A servovalve as defined in claim 1 wherein each of said end portions includes an end face adapted to be interposed in the fluid discharged from said discharge orifice means, said end faces being inclined and diverging in the direction of flow.

3. A servovalve as defined in claim 1 wherein each of said end portions has an end face which terminates in the direction of flow in a substantially straight edge.

4. A servovalve as defined in claim 1 wherein said ejector passage means includes first and second ejector passages adapted to be in communication with the source of fluid and said discharge orifice means includes first and second discharge orifices for the first and second ejector passages, respectively, said orifices discharging first and second fluid streams generally toward the first and second receiver orifices, respectively, said diverter being positionable to divert said first and second streams with said first and second end portions, respectively.

5. A servovalve as defined in claim 4 wherein said first and second end portions include first and second end faces, respectively, said end faces diverging in the direction of flow of said streams.

6. A servovalve as defined in claim 1 wherein said torque motor includes electromagnetic means for pivoting the torque arm, spring means for resisting the pivotal movement of the torque arm, and conduit means for providing communication between the spring means and the space between said receiver orifices and said discharge orifice means so that the spring means is unaffected by any changes in fluid pressure occurring in said space.

7. A servovalve as defined in claim 6 wherein said spring means includes at least one spring strip, the fluid from said space acting on both faces of said strip whereby changes in fluid pressure in said space do not affect said spring strip.

8. A servovalve as defined in claim 1 wherein said torque motor includes an isolation tube, and a coil wound around the isolation tube, said torque arm being receivable in said isolation tube, said isolation tube being in communication with the fluid and assisting to keep the fluid from contacting the coil.

9. A servovalve as defined in claim 1 wherein said pivot axis of said torque arm lies outside of said space between the discharge orifice means and the receiver orifices.

10. A servovalve as defined in claim 1 wherein each of said end portions includes an end face and each of said end faces has at least two straight, parallel edges.

11. A servovalve as defined in claim 1 wherein each of said end portions includes an planar end face.

12. A servovalve as defined in claim 1 wherein said pivot axis of said torque arm lies outside of said space between the discharge orifice means and the receiver orifices, each of said end portions includes an end face and each of said end faces has at least two straight, parallel edges, said torque motor includes electromagnetic means for pivoting the torque arm, spring means for resisting the pivotal movement of the torque arm, and conduit means for providing communication between the spring means and the space between said receiver orifices and said discharge orifice means so that the spring means is unaffected by any changes in fluid pressure occurring in said space, said spring means includes at least one spring strip, the fluid from said space acting on both faces of said strip whereby changes in fluid pressure in said space do not affect said spring strip.

* * * * *